(12) United States Patent
Yoshihara

(10) Patent No.: US 9,110,707 B2
(45) Date of Patent: Aug. 18, 2015

(54) ASSIGNING WIDEIO MEMORIES TO FUNCTIONS BASED ON MEMORY ACCESS AND ACQUIRED TEMPERATURE INFORMATION

(71) Applicant: CANON KABUSHIKI KAISHA, Tokyo (JP)

(72) Inventor: Toshio Yoshihara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 13/958,194

(22) Filed: Aug. 2, 2013

(65) Prior Publication Data

US 2014/0059550 A1 Feb. 27, 2014

(30) Foreign Application Priority Data

Aug. 24, 2012 (JP) ................................. 2012-185765

(51) Int. Cl.
*G06F 9/50* (2006.01)
*G06F 9/46* (2006.01)
*G06F 1/20* (2006.01)

(52) U.S. Cl.
CPC *G06F 9/46* (2013.01); *G06F 1/206* (2013.01); *G06F 9/5016* (2013.01); *G06F 9/5094* (2013.01); *G06F 9/50* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 2007/0106860 A1* | 5/2007 | Foster et al. | 711/170 |
| 2009/0328055 A1* | 12/2009 | Bose et al. | 718/105 |
| 2011/0302582 A1* | 12/2011 | Jacobson et al. | 718/102 |
| 2012/0018885 A1 | 1/2012 | Lee et al. | |
| 2012/0249219 A1* | 10/2012 | Shoemaker | 327/512 |
| 2013/0047142 A1* | 2/2013 | Bates et al. | 717/140 |
| 2013/0067136 A1* | 3/2013 | Bates et al. | 711/103 |
| 2013/0178999 A1* | 7/2013 | Geissler et al. | 700/300 |
| 2014/0098404 A1* | 4/2014 | Kambegawaa | 358/1.16 |
| 2014/0108841 A1* | 4/2014 | Tomia | 713/323 |
| 2014/0160531 A1* | 6/2014 | Mima | 358/1.16 |
| 2015/0082062 A1* | 3/2015 | Saraswat et al. | 713/323 |

* cited by examiner

*Primary Examiner* — Emerson Puente
*Assistant Examiner* — Benjamin Wu
(74) *Attorney, Agent, or Firm* — Fitzpatrick, Cella, Harper & Scinto

(57) ABSTRACT

Temperature information of each of a plurality of memories of a WideIO memory device is acquired. In a case that the execution of a function is designated, a memory to be used by a function module corresponding to the function is determined based on the memory access amount of the function module corresponding to the function and the acquired temperature information of the plurality of memories.

11 Claims, 13 Drawing Sheets

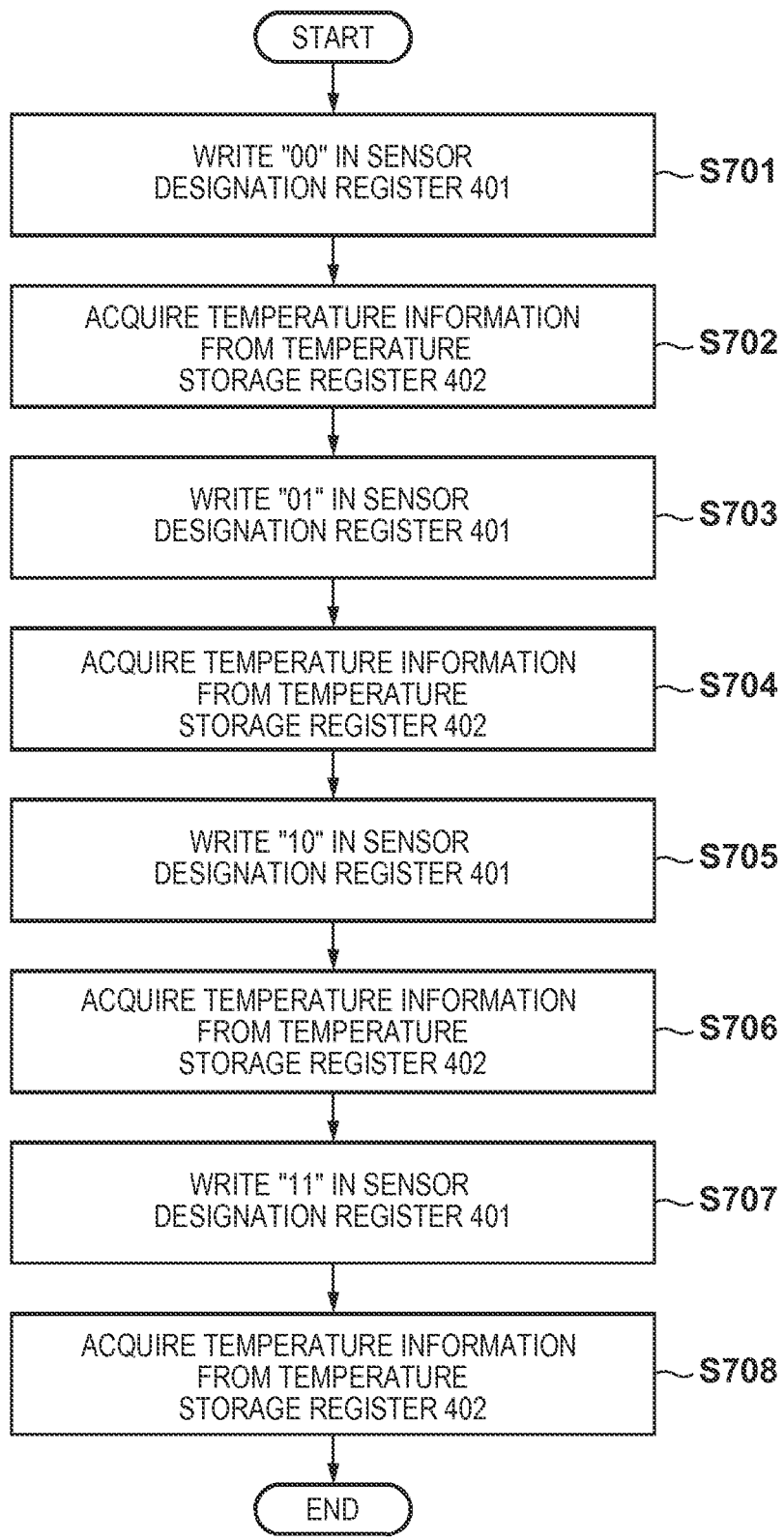

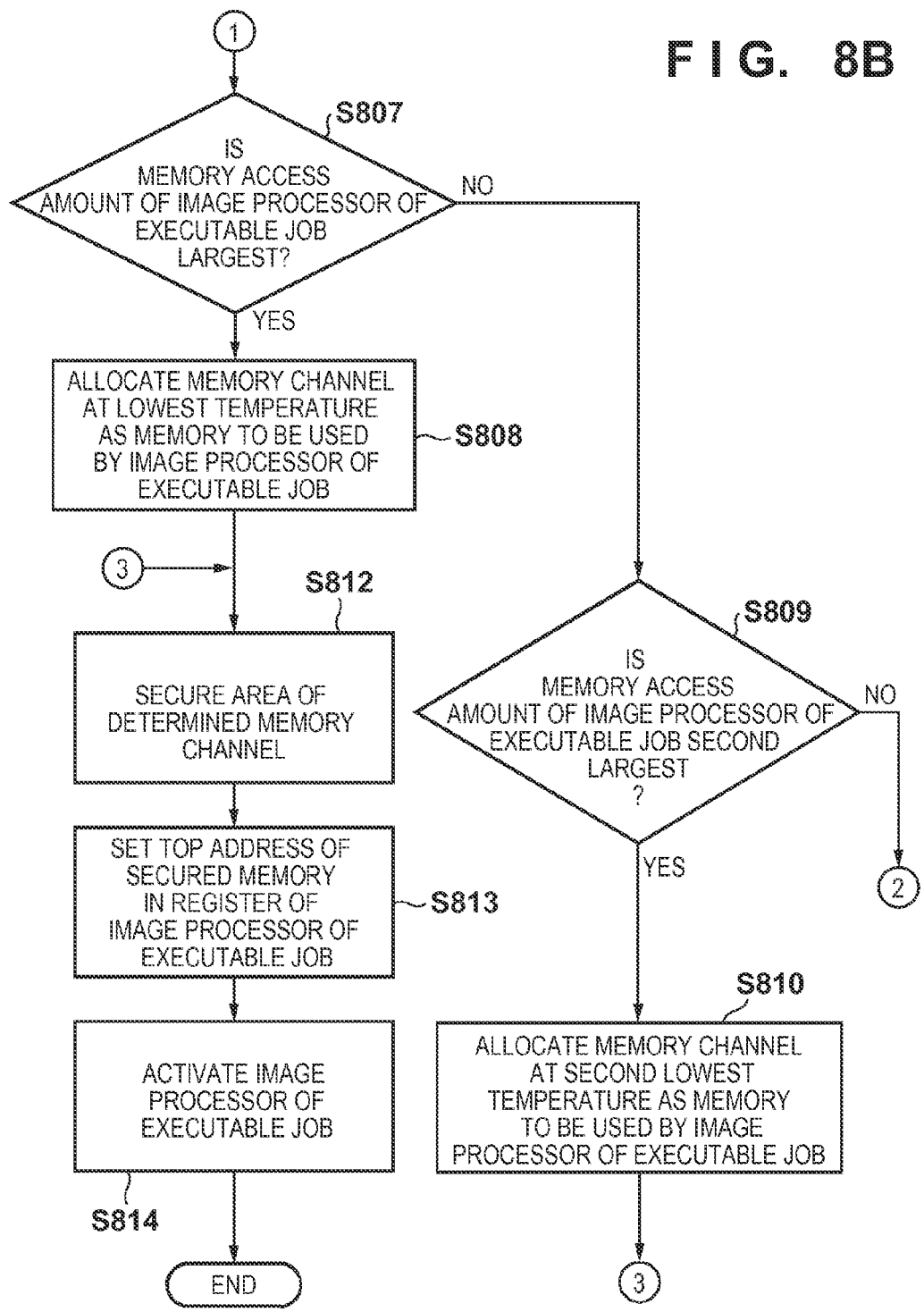

F I G. 9A

| TEMPERATURE SENSOR NAME | TEMPERATURE INFORMATION |
|---|---|
| TEMPERATURE SENSOR 309 | 50°C |
| TEMPERATURE SENSOR 310 | 60°C |
| TEMPERATURE SENSOR 311 | 65°C |
| TEMPERATURE SENSOR 312 | 70°C |

F I G. 9B

| MODULE NAME | MEMORY ACCESS AMOUNT ORDER |
|---|---|
| RIP | 1 |
| PRINT IMAGE PROCESSOR | 2 |
| SCAN IMAGE PROCESSOR | 3 |
| EDITING IMAGE PROCESSOR | 4 |

F I G. 10

| MODULE NAME | MEMORY ACCESS AMOUNT RATIO | PROCESSABILITY RATIO | MEMORY ALLOCATION ORDER (MEMORY ACCESS AMOUNT RATIO)/(PROCESSABILITY RATIO) |
|---|---|---|---|
| RIP | 1 | 1 | 1 |
| PRINT IMAGE PROCESSOR | 0.7 | 1 | 0.7 |
| SCAN IMAGE PROCESSOR | 0.6 | 0.8 | 0.75 |
| EDITING IMAGE PROCESSOR | 0.5 | 1 | 0.5 |

F I G. 12

| MODULE NAME | MEMORY ACCESS AMOUNT INFORMATION (MB) | MEMORY ACCESS AMOUNT ORDER |
|---|---|---|
| RIP | 300 | 1 |
| PRINT IMAGE PROCESSOR | 200 | 2 |
| SCAN IMAGE PROCESSOR | 100 | 4 |
| EDITING IMAGE PROCESSOR | 120 | 3 |

US 9,110,707 B2

ASSIGNING WIDEIO MEMORIES TO FUNCTIONS BASED ON MEMORY ACCESS AND ACQUIRED TEMPERATURE INFORMATION

BACKGROUND OF THE INVENTION

1. Field of the Invention

The present invention relates to an information processing apparatus including a WideIO memory device stacked on a SOC (System On a Chip) die including a CPU, a method of controlling the same, and storage medium.

2. Description of the Related Art

In an information processing apparatus including a CPU such as a microprocessor, a DRAM is often used to save data for executing an OS and various applications, and to temporarily save data for executing image processing. This DRAM is used as it is connected to a CPU, SOC (System on a Chip), or the like. Recently, the memory bandwidth of the DRAM is increasing as multifunctional high-performance image processing apparatuses have been developed. To increase the memory bandwidth, the clock frequency of memory access is raised in the standards such as DDR3 (Double-Date-Rate3) or DDR4. In addition, the memory bandwidth is secured by using a plurality of DRAM channels connected to a CPU or ASIC (Application Specific Integrated Circuit). However, raising the clock frequency or using a plurality of memory channels poses the new problem that the power consumption increases.

A next generation DRAM standard is presently attracting attention. WideIO is formed by stacking a DRAM chip on a SOC die by using a 3D stacking technique using a TSV (Through Silicon Via). WideIO has the features that a high bandwidth of a maximum of 12.8 (GB/sec) or more is obtained with a large data width of 512 bits, and the power consumption is low because the access frequency is lowered. Also, the use of the TSV can make the package thinner and smaller than that of conventional PoP (Package on Package). In addition, as a measure to heat generated because the memory is stacked in the SOC package, a temperature sensor for sensing the temperature of the memory is incorporated, and the self-refresh rate is changed in accordance with the sensed temperature. Furthermore, the 512-bit data width is divided into four 128-bit channels, and these channels can be controlled independently of each other. For example, it is possible to set channels 1 and 2 in a self-refresh state, and use channels 3 and 4 in normal memory access. The basic structure and basic access method of WideIO are described in U.S. Patent Application Publication No. 2012/0018885 A1.

The multilayered structure of WideIO is susceptible to heat. For example, when a specific region of the SOC die and the WideIO DRAM positioned in an upper layer of this specific region are simultaneously activated, the temperature of the activated portions locally rises. Therefore, it is necessary to shorten the refresh interval of the DRAM. In addition, the power consumption increases due to the influence of a semiconductor leakage current that exponentially increases with respect to the temperature. Since the temperature locally rises, the refresh frequency of the whole DRAM must be increased for the partial region of the DRAM, so the access performance of the DRAM decreases. When the access performance of the DRAM thus decreases, the performance of a system including this SOC package decreases, and this decreases the product performance.

To improve the system performance, it is particularly necessary to take account of the performance of a module as a bottleneck. This is so because the decrease in performance of a bottleneck module directly leads to the decrease in system performance. Especially in the WideIO DRAM, the above-described heat influence is a big problem. That is, the amount of access of a bottleneck module to the DRAM is large, and the large amount of access from this module raises the temperature of the WideIO DRAM. This temperature rise makes it necessary to increase the DRAM refresh frequency described above, thereby decreasing the DRAM access performance. This vicious cycle decreases the performance of the bottleneck module, and the system performance decreases accordingly.

SUMMARY OF THE INVENTION

An aspect of the present invention is to eliminate the above-mentioned problems with the conventional technology.

A feature of the present invention is to provide a technique for suppressing the decrease in performance caused by the temperature rise of a memory allocated to a function module when using a WideIO memory.

According to an aspect of the present invention, there is provided an information processing apparatus having a WideIO memory device stacked on a SOC die including a CPU, the apparatus comprising: a temperature acquisition unit configured to acquire temperature information of each of a plurality of memories of the WideIO memory device; a plurality of function modules configured to execute functions; and a determination unit configured to determine, in a case that execution of a function is designated, a memory to be used by a function module corresponding to the function, based on a memory access amount of the function module corresponding to the function and the temperature information of the plurality of memories acquired by the temperature acquisition unit.

According to another aspect of the present invention, there is provided a method of controlling an information processing apparatus including a WideIO memory device stacked on a SOC die including a CPU, the method comprising: acquiring temperature information of each of a plurality of memories of the WideIO memory device; and determining, in a case that execution of a function by each function module configured to execute each function is designated, a memory to be used by a function module corresponding to the function, based on a memory access amount of the function module corresponding to the function and the temperature information of the plurality of memories acquired in the acquiring step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart for describing a process of acquiring temperature information measured by a CPU by using temperature sensors in the MFP according to the first embodiment;

FIGS. 8A and 8B are flowcharts for describing a process of determining the allocation of memory channels when executing a job in the MFP according to the first embodiment;

FIG. 9A depicts a view showing an example of the temperature information sensed by the temperature sensors in the first embodiment;

FIG. 9B depicts a view showing an example of data of a memory access amount order register according to the first embodiment;

FIG. 10 depicts a view showing an example of a table setting a memory allocation order by adding the processability of each image processor to a memory access amount order according to the second embodiment;

FIG. 12 depicts a view showing an example of data of a memory access amount order register according to the third embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that an information processing apparatus including WideIO according to an embodiment will be explained by taking an MFP (digital multifunctional peripheral) having a plurality of functions such as scanning, printing, and copying as an example. However, the present invention is not limited to this MFP, and also applicable to a general PC and the like.

First Embodiment

Figure 1:
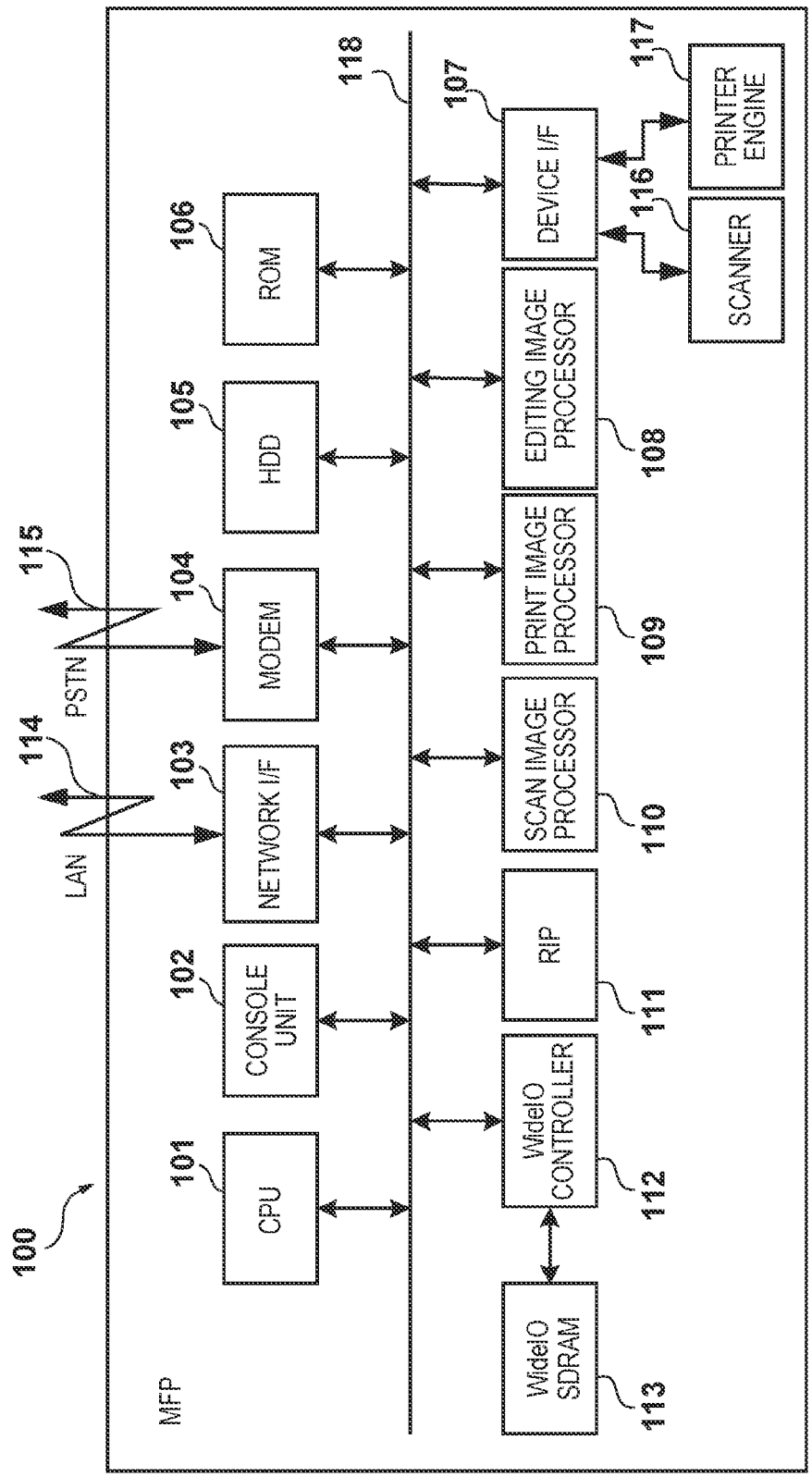
FIG. 1 is a block diagram showing the overall arrangement of an MFP (digital multifunctional peripheral) according to the first embodiment.

FIG. 1 is a block diagram showing the overall arrangement of an MFP (digital multifunctional peripheral) according to the first embodiment.

An MFP 100 includes a scanner 116 as an image input device and a printer engine 117 as an image output device, and these devices are connected to a system bus 118 via a device interface (I/F) 107. The scanner 116 can read an image of an original and the printer engine 117 can perform printing under the control of a CPU 101. Also, the MFP 100 is connected to a LAN 114 and public network (PSTN) 115, and can exchange device information and image data with external apparatuses connected to the LAN 114 and public network 115.

The CPU 101 controls the operation of the MFP 100 by executing a program expanded on a WideIO-SDRAM 113 from an HDD 105 by a boot program stored in a ROM 106. A console unit 102 includes an input unit and display unit such as a keyboard and touch panel. The console unit 102 accepts instructions from a user, and displays messages to the user, processing results, and the like on the display unit. A network I/F 103 is implemented by a LAN card or the like, and exchanges device information and image data with an external apparatus across the LAN 114. A modem 104 exchanges control information and image data with an external apparatus across the public network 115. The HDD 105 is a hard disk drive and stores an OS, various application programs, input image data, and the like. The ROM 106 stores the boot program and various kinds of data. The device I/F 107 is connected to the scanner 116 and printer engine 117, and transfers image data between each of the scanner 116 and printer engine 117 and the system bus 118.

An editing image processor 108 performs various kinds of image processing such as image data rotation and scaling, color processing, trimming/masking, binary conversion, multilevel conversion, and blank paper determination. A print image processor 109 performs image processing corresponding to the printer engine 117 on image data output to the printer engine 117. A scan image processor 110 performs various processes such as correction, processing, and editing on image data input from the scanner 116. A RIP (Raster Image Processor) 111 rasterizes a page description language (PDL) code into image data. A WideIO controller (Wide I/O controller) 112 converts a memory access command from, for example, the CPU 101 or each image processor into a command interpretable by the WideIO-SDRAM 113, and accesses the WideIO-SDRAM 113. The WideIO-SDRAM 113 stores programs to be executed by the CPU 101, and provides a system work memory for the CPU 101 to operate. The WideIO-SDRAM 113 also provides an image memory for temporarily storing input image data. The system bus 118 connects the CPU 101 to each of the above-described units, and transfers control signals, data, and the like.

Figure 2A:
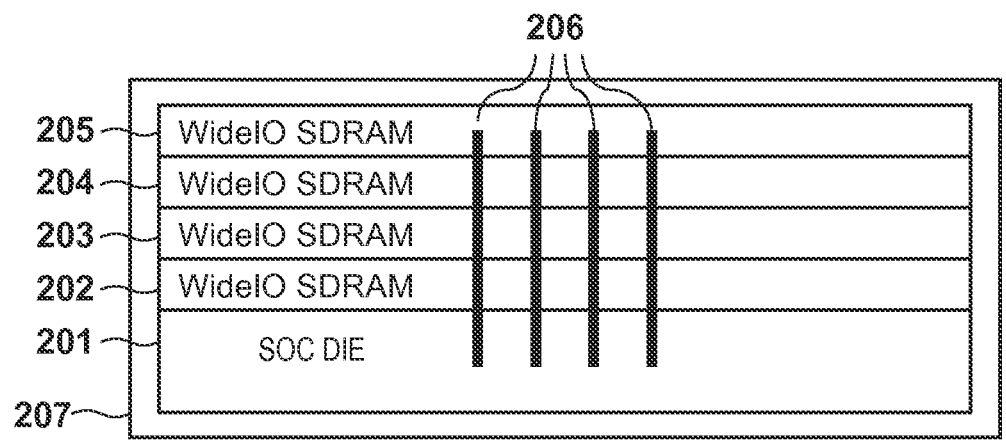
FIGS. 2A and 2B depict schematic views showing the structure of WideIO-SDRAMs (Wide I/O SDRAMs) according to the first embodiment.
Figure 2B:
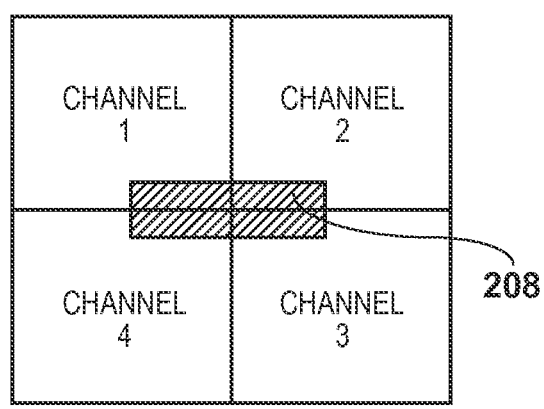

FIGS. 2A and 2B depict schematic views showing the structure of the WideIO-SDRAM 113 according to the first embodiment. FIG. 2A depicts a side view showing WideIO-SDRAMs and a SOC die from the side surface, and FIG. 2B depicts a plan view showing them from above.

A SOC die 201 includes the CPU 101, device I/F 107, RIP 111, and image processors 108 to 110 in the first embodiment. WideIO-SDRAMs 202 to 205 are stacked on the SOC die 201, and connected to the SOC die 201 by through silicon vias (TSVs) 206. A maximum of four WideIO-SDRAMs can be stacked in accordance with a necessary memory capacity. FIG. 2A shows an example in which four layers are stacked. A SOC package 207 contains the SOC die 201 and WideIO-SDRAMs 202 to 205 in one package. A WideIO-SDRAM I/F 208 is positioned in the middle of the SOC die 201 and WideIO-SDRAMs 202 to 205 as shown in FIG. 2B.

Figure 3:
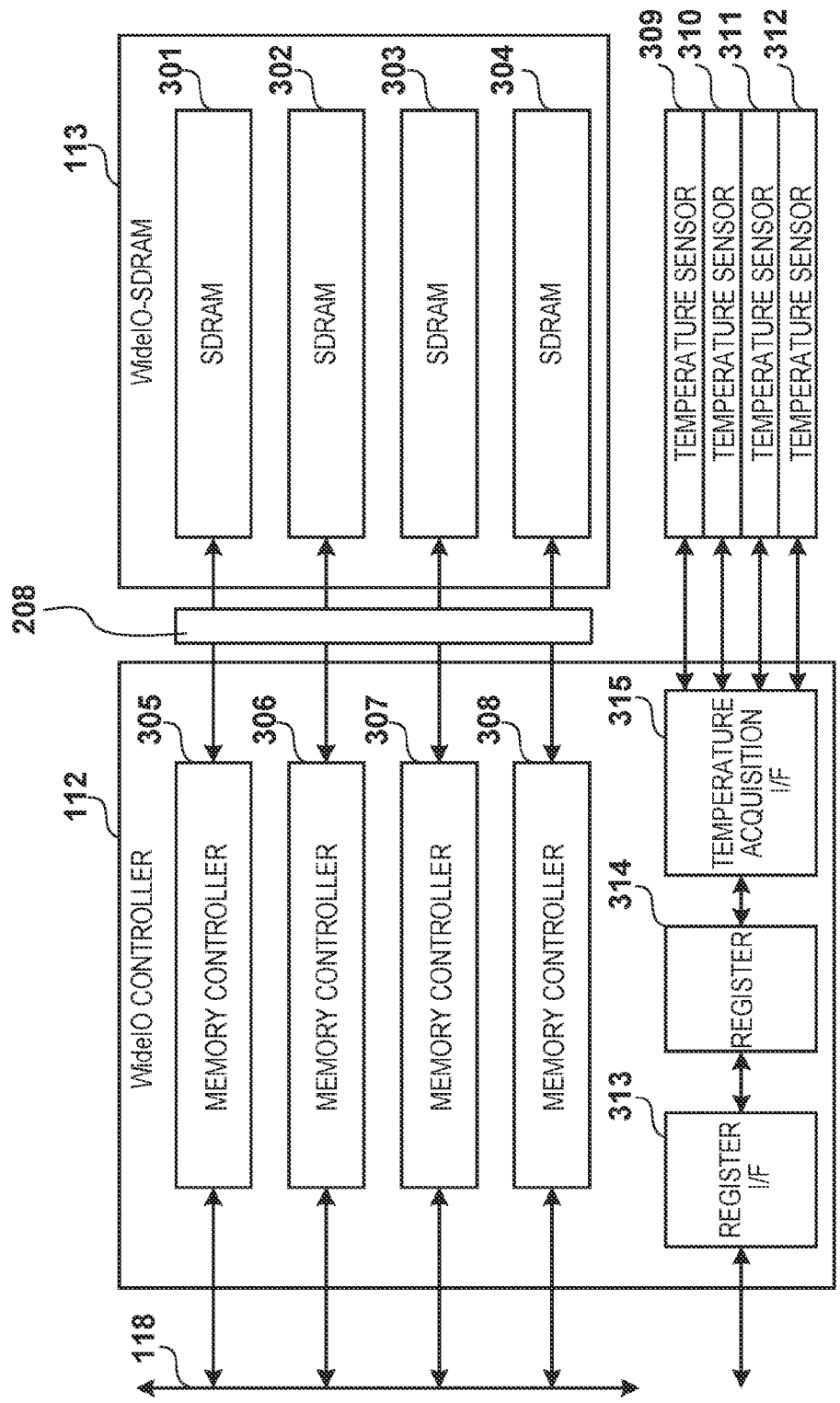
FIG. 3 is a block diagram showing the internal arrangement of a WideIO controller according to the first embodiment.

FIG. 3 is a block diagram showing the internal arrangement of the WideIO controller (Wide I/O controller) 112 according to the first embodiment.

Referring to FIG. 3, the WideIO controller 112 is connected between the system bus 118 and WideIO-SDRAM 113, as shown in FIG. 1. The WideIO controller 112 is also connected to temperature sensors 309 to 312 not shown in FIG. 1.

SDRAMs 301 to 304 are four memories formed in the WideIO-SDRAM 113, and each includes a dedicated interface as shown in FIG. 3. These dedicated interfaces are equivalent to the four channels of the WideIO-SDRAMs 202 to 205 stacked on the SOC die 201 as described previously, and each dedicated interface is equivalent to the WideIO-SDRAM I/F 208 shown in FIG. 2B. Each of memory controllers 305 to 308 converts a memory access command from the system bus 118 into a command interpretable by a connected corresponding SDRAM, and accesses the SDRAM. The temperature sensors 309 to 312 respectively measure the temperature of a corresponding one of the SDRAMs 301 to 304.

A register I/F 313 accepts access from the CPU 101 via a register dedicated bus (not shown). A register 314 stores temperature information acquired from the temperature sensors 309 to 312 by a temperature acquisition I/F 315, and setting information of the operation modes of the memory controllers 305 to 308, which are set from the CPU 101. When detecting a temperature acquisition request from a temperature storage register 402 (FIG. 4) (to be described later), the temperature acquisition I/F 315 issues a command for acquiring temperature information sensed by a temperature sensor designated by a sensor designation register 401 (FIG. 4) (to be described later), thereby acquiring the temperature information. The temperature information thus acquired is stored in the temperature storage register 402 (to be described later).

Figure 4:
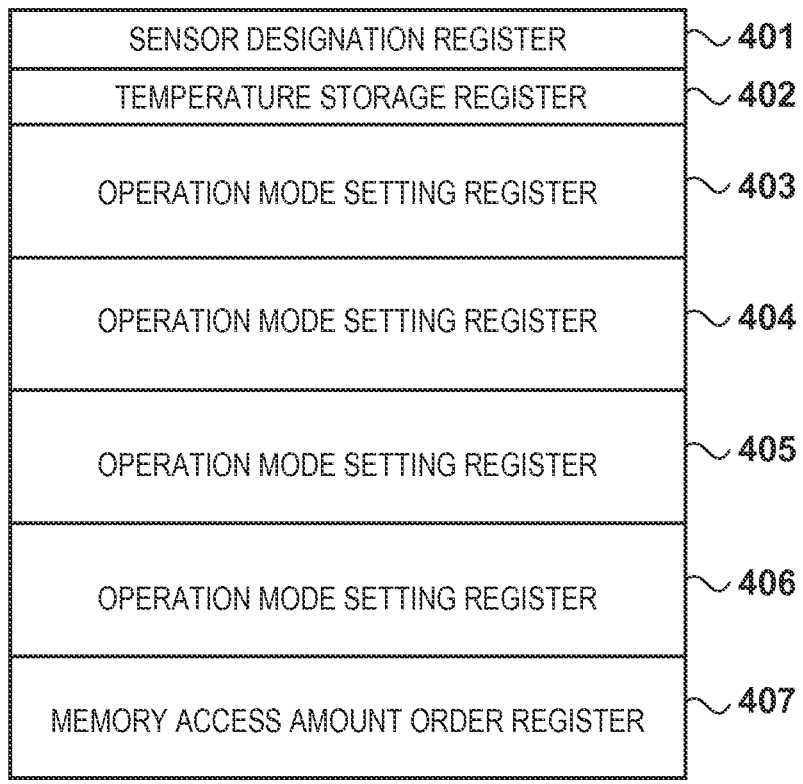
FIG. 4 depicts a view for explaining the arrangement of registers according to the first embodiment.

FIG. 4 depicts a view for explaining the arrangement of the register 314 according to the first embodiment.

The register 314 includes the sensor designation register 401, the temperature storage register 402, operation mode setting registers 403 to 406, and a memory access amount order register 407. When the CPU 101 needs to acquire temperature information sensed by the temperature sensor, the sensor designation register 401 stores information for designating the temperature sensor as a target. Since the first embodiment is explained by using an example including the four temperature sensors, the sensor designation register 401 is a two-bit register, and can specify each of the four temperature sensors in accordance with each state of two bits. When receiving a temperature acquisition request from the CPU 101, the temperature storage register 402 requests the temperature acquisition I/F 315 to acquire temperature information sensed by the temperature sensor designated by the sensor designation register 401. The temperature storage register 402 stores the temperature information acquired via the temperature acquisition I/F 315, and outputs the stored temperature information in response to a temperature read request from the CPU 101.

FIG. 9A depicts a view showing an example of the temperature information sensed by the temperature sensors 309 to 312 in the first embodiment. Referring to FIG. 9A, the temperature sensed by the temperature sensor 312 of the SDRAM 304 corresponding to channel 4 is highest, and the temperature sensed by the temperature sensor 309 of the SDRAM 301 corresponding to channel 1 is lowest.

The operation mode setting registers 403 to 406 are registers for respectively setting the operation modes of the memory controllers 305 to 308, and store setting values for memory control of the SDRAMs 301 to 304. Examples of the setting values for memory control are the time interval of the refresh operation of the DRAM, and a memory access timing parameter. Note that the operation mode setting register 403 sets the operation mode of the memory controller 305 and the operation mode setting register 404 sets the operation mode of the memory controller 306 and the operation mode setting registers 405 and 406 set the operation modes of the memory controllers 307 and 308, respectively.

The memory access amount order register 407 stores, in descending order, the memory access amounts to the SDRAMs 301 to 304, which are required by function modules that access the SDRAMs. Note that in the first embodiment, the editing image processor 108, print image processor 109, scan image processor 110, and RIP 111 shown in FIG. 1 are the function modules. The CPU 101 allocates memories to these function modules by referring to the values (ordinal numbers) of the memory access amount order register 407. The values of the memory access amount order register 407 are predetermined when the MFP 100 according to the first embodiment is designed, and set by the CPU 101 by writing the ordinal numbers in the memory access amount order register 407 when the system is activated.

FIG. 9B depicts a view showing an example of the data of the memory access amount order register 407 according to the first embodiment.

Since the RIP 111 is a function module requiring the largest memory access amount, the ordinal number of the memory access amount is set to "1". That is, the ordinal numbers are set in descending order of necessary memory access amount. When arranged in descending order of memory access amount, the order is the RIP 111, the print image processor 109, scan image processor 110, and editing image processor 108.

Figure 5:
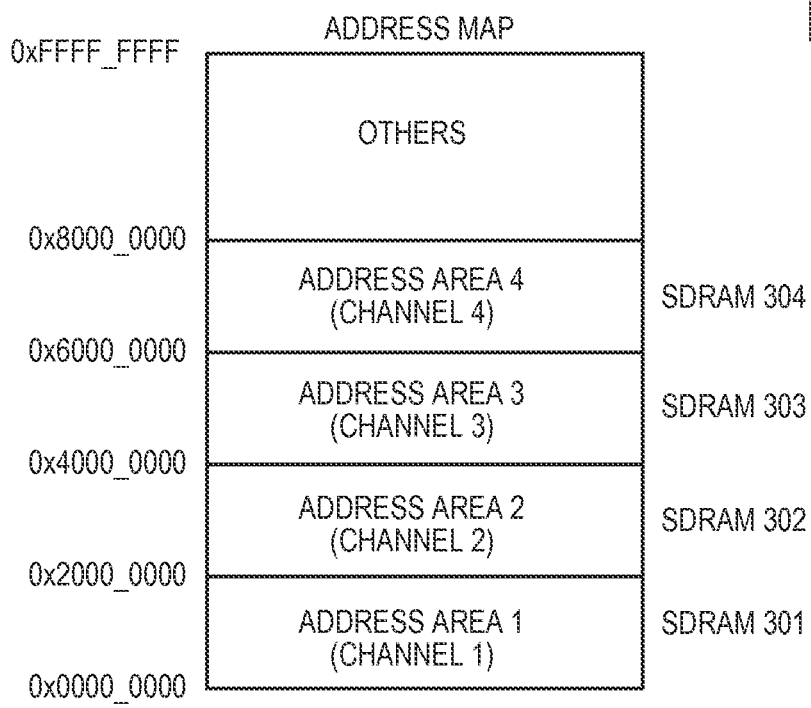
FIG. 5 depicts a view for explaining an address map indicating address areas allocated to the SDRAMs according to the first embodiment.

FIG. 5 depicts a view for explaining an address map indicating address areas allocated to the SDRAMs 301 to 304 according to the first embodiment.

In the first embodiment, address areas 1, 2, 3, and 4 are respectively allocated to the SDRAMs 301, 302, 303, and 304. Note that the size of each address area is not limited to that shown in FIG. 5. Note that the above-described programs of the CPU 101 are expanded in address area 1 of the SDRAM 301.

Figure 6:
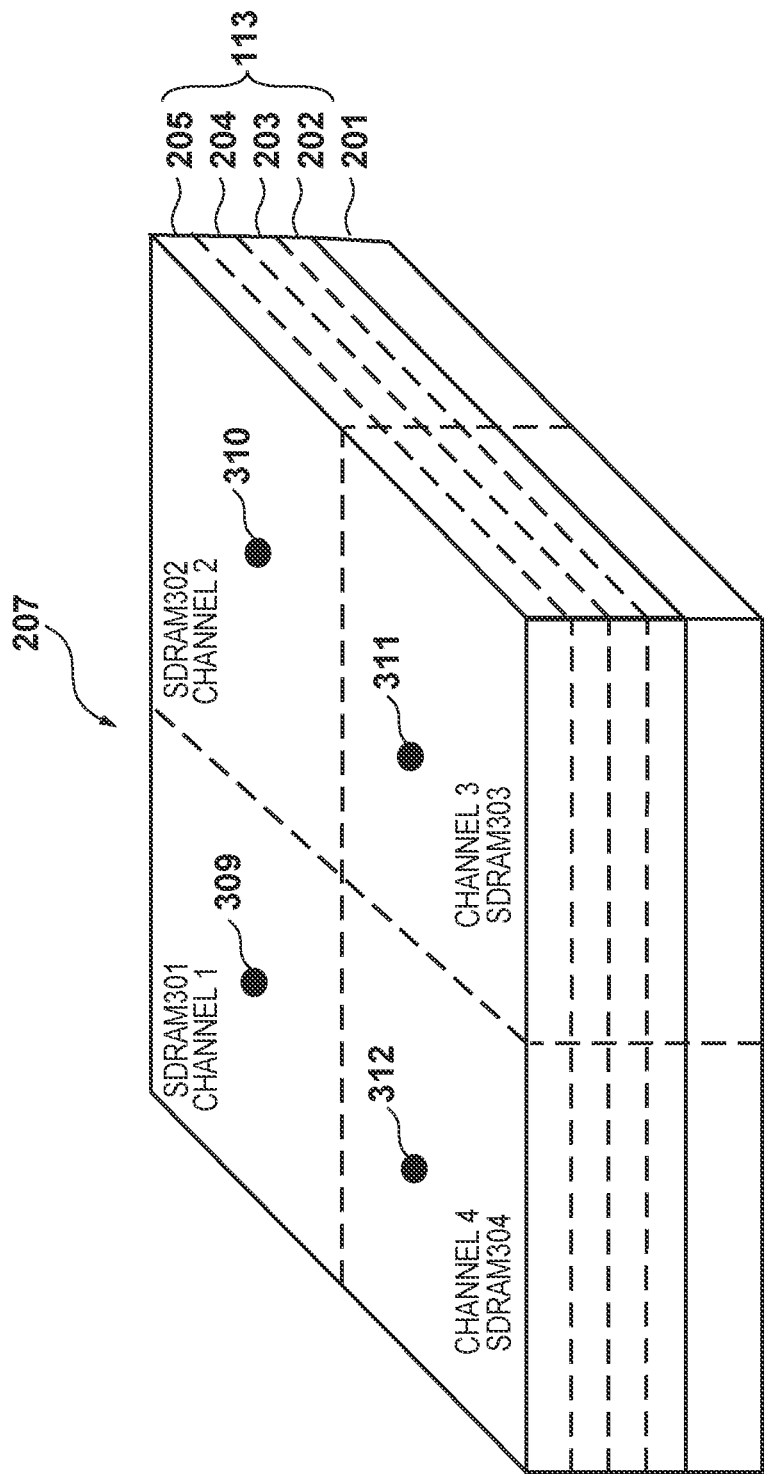
FIG. 6 depicts an overhead view of a SOC package according to the first embodiment.

FIG. 6 depicts an overhead view of the SOC package 207, which explains the physical positional relationship between the SOC die 201 and the WideIO-SDRAMs 202 to 205 shown in FIG. 2 in more detail.

The SOC die 201 includes the CPU 101, device I/F 107, RIP 111, and above-described image processors 108 to 110. When the plane of the SOC package 207 is divided into four regions, the upper left, upper right, lower right, and lower left regions respectively correspond to channels 1, 2, 3, and 4 shown in FIG. 2B. Likewise, the four divided regions also correspond to the SDRAMs 301 to 304 shown in FIG. 3. As described previously, the WideIO-SDRAM 113 is a memory stacked on the SOC die 201. In the first embodiment, each of the SDRAMs 301 to 304 is stacked as four layers on a corresponding one of the four divided regions of the SOC die 201 as shown in FIG. 6. The SDRAMs 301 to 304 incorporate the temperature sensors 309 to 312 so as to measure the internal temperatures of these memories. However, the layout of the SDRAMs and the layout of the temperature sensors are not limited to those shown in FIG. 6, and they are merely examples. The temperature sensors 309 to 312 may also be incorporated into the SOC die 201, or incorporated into the WideIO-SDRAM 113.

FIG. 7 is a flowchart for describing a process by which the CPU 101 acquires temperature information measured by the temperature sensors 309 to 312 in the MFP 100 according to the first embodiment. Since the first embodiment includes the four temperature sensors, the flowchart shown in FIG. 7 also acquires temperature information from the four temperature sensors. Note that a program for executing this process is installed in the HDD 105, and the process is implemented by deploying the program on the SDRAM 301, and executing the program on the SDRAM 301 by the CPU 101.

First, in step S701, the CPU 101 writes "00" in the sensor designation register 401. The first embodiment includes the four temperature sensors, and these temperature sensors and the setting values of the sensor designation register 401 are made to correspond to each other as follows in order to designate each temperature sensor. That is, values "00", "01", "10", and "11" of the sensor designation register 401 are respectively made to correspond to the temperature sensors 309, 310, 311, and 312. In step S701, therefore, the CPU 101 writes "00" in the sensor designation register 401 in order to designate the temperature sensor 309. Then, in step S702, the CPU 101 issues a temperature read request to the temperature storage register 402, and acquires temperature information measured by the temperature sensor 309. In this step, as described previously, when detecting the read request from the CPU 101, the temperature storage register 402 acquires temperature information sensed by the temperature sensor designated by the sensor designation register 401. The temperature storage register 401 outputs the acquired temperature information to the CPU 101, as response data to the read request from the CPU 101. In step S702, therefore, the CPU 101 acquires the temperature information measured by the temperature sensor 309.

Subsequently, in step S703, the CPU 101 writes "01" in the sensor designation register 401 in order to acquire temperature information measured by the temperature sensor 310. In step S704, the CPU 101 issues a temperature read request to the temperature storage register 402, and acquires temperature information measured by the temperature sensor 310. In step S705, the CPU 101 writes "10" in the sensor designation register 401 in order to acquire temperature information measured by the temperature sensor 311. In step S706, the CPU 101 issues a temperature read request to the temperature storage register 402, and acquires temperature information measured by the temperature sensor 311. In step S707, the CPU 101 writes "11" in the sensor designation register 401 in order to acquire temperature information measured by the temperature sensor 312. In step S708, the CPU 101 issues a temperature read request to the temperature storage register 402, and acquires temperature information measured by the temperature sensor 312. By the above process, the CPU 101 can acquire temperature information measured by each temperature sensor, that is, the temperature information of each SDRAM or each channel.

Figure 8A:
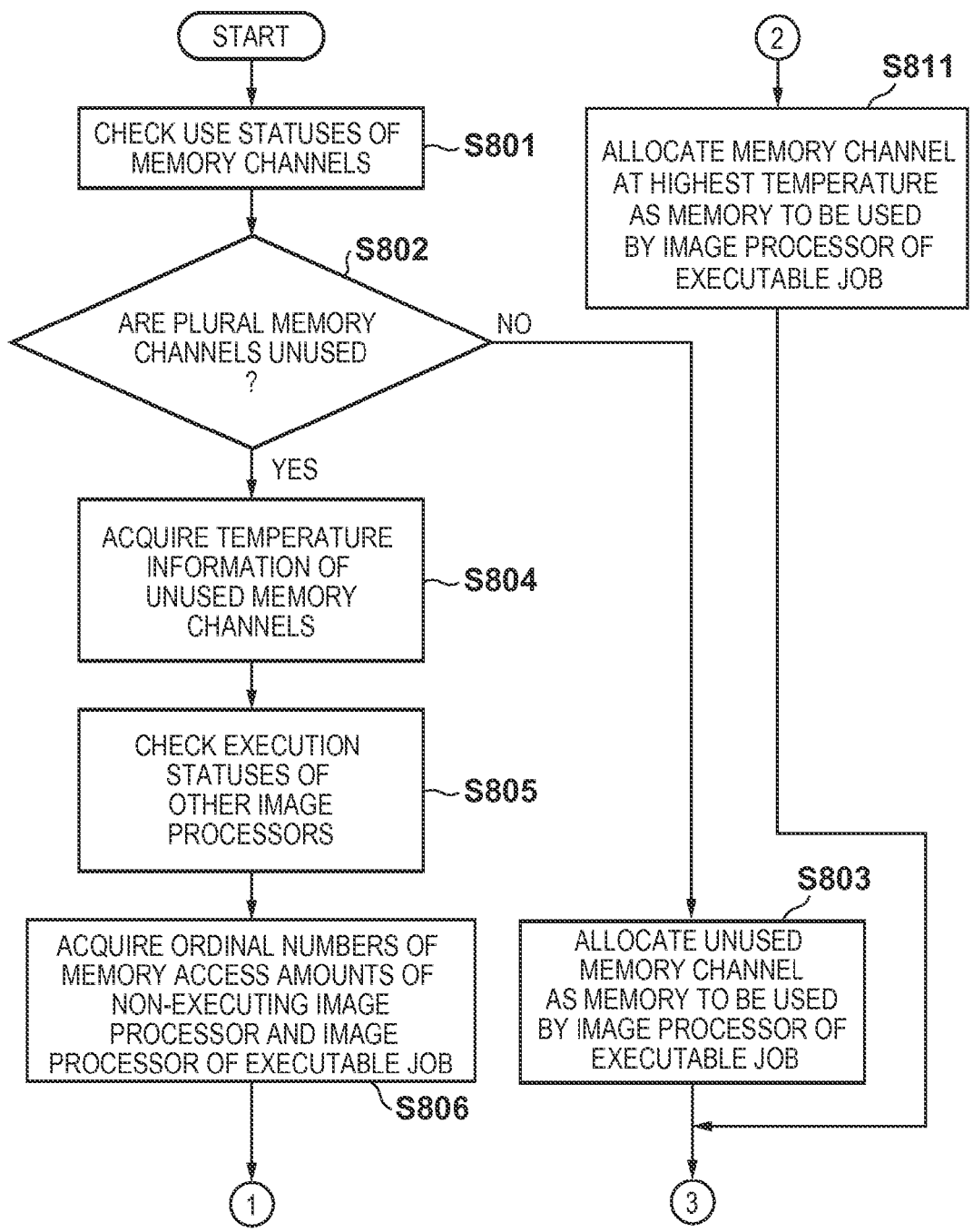

FIGS. 8A and 8B are flowcharts for describing a process of determining the allocation of memory channels when executing a job in the MFP 100 according to the first embodiment. Note that a program for executing this process is installed in the HDD 105, and the process is implemented by deploying the program on the SDRAM, and executing the program on the SDRAM by the CPU 101.

This process is a process of determining, after the CPU 101 has received a job such as copying or printing from the console unit 102 or network I/F 103, a memory channel to be allocated to the RIP 111 or image processors 108 to 110 required to be operated in order to execute the job. That is, this flowchart is executed after the CPU 101 has accepted an input job and before the CPU 101 executes the job.

Each of the image processors including the RIP 111 uses a predetermined one of the plurality of memory channels. The memory channels are distributed to satisfy the performance by the calculation of the memory bandwidth when designing the system. To simplify the explanation, it is assumed in the first embodiment that the four image processors, that is, the editing image processor 108, print image processor 109, scan image processor 110, and RIP 111 are respectively allocated to the WideIO-SDRAMs 301, 302, 303, and 304.

First, in step S801, the CPU 101 acquires the use statuses of the memory channels of the WideIO-SDRAMs 301 to 304. This step is performed by the CPU 101 by checking a memory area secured by an image processor, thereby checking which channel is currently used. Also, after the processing by the image processor is complete, the CPU 101 can confirm that the memory channel is free, by releasing the memory area secured by the image processor.

Then, in step S802, the CPU 101 determines whether there are a plurality of unused memory channels, based on the memory channel use statuses acquired in step S801. If there is only one unused memory channel, the process advances to step S803. If there are a plurality of unused memory channels, the process advances to step S804. In step S803, the CPU 101 allocates the unused memory channel as a memory to be used by an image processor to be used in a job to be executed, and the process advances to step S812 (FIG. 8B). The state in step S803 is equivalent to a case in which three remaining channels are being used, that is, all other image processors are executing processing, so the image processors competitively execute the designated job.

In step S804, the CPU 101 acquires temperature information of the temperature sensors of the plurality of unused memory channels acquired in step S801. The CPU 101 executes this acquisition of the temperature information of the memory channels in accordance with the flowchart shown in FIG. 6. In step S805, the CPU 101 determines which image processor is not executing any processing based on the memory channel use statuses acquired in step S801, and the process advances to step S806. In step S806, the CPU 101 reads out, from the memory access amount order register 407, the ordinal number of the memory access amount of an image processor to be used in a job to be executed (this job will be referred to as an executable job hereinafter), and the ordinal number of the memory access amount of the non-executing image processor acquired in step S805, and the process advances to step S807 (FIG. 8B). In step S807, based on the memory access amount ordinal numbers of the image processor of the executable job and the non-executing image processor acquired in step S806, the CPU 101 determines whether the ordinal number of the image processor of the executable job is smallest (whether the access amount is largest). That is, the CPU 101 determines whether the image processor of the executable job has the largest access amount among the non-executing image processors. If the image processor of the executable job has the largest access amount, the process advances to step S808, and the CPU 101 allocates a memory channel at the lowest temperature as a memory to be used by the image process of the executable job, based on the temperature information acquired in step S804. After that, the process advances to step S812. Note that if the pieces of acquired information are the same, a channel having a smaller channel number is allocated.

On the other hand, if the ordinal number of the memory access amount of the image processor of the executable job is not 1 in step S807, that is, if the image processor of the executable job is not an image processor having the largest memory access amount in step S807, the process advances to step S809. In step S809, the CPU 101 determines whether the ordinal number of the image processor of the executable job is the second smallest number, based on the ordinal numbers of the memory access amounts of the image processor of the executable job and the non-executing image processors acquired in step S806. That is, the CPU 101 determines whether the image processor of the executable job is an image processor having the second largest access amount among the non-executing image processors. If the image processor of the executable job is an image processor having the second largest access amount, the process advances to step S810, and the CPU 101 allocates a memory channel at the second lowest temperature as a memory to be used by the image processor of the executable job, based on the temperature information acquired in step S804. After that, the process advances to step S812. Note that if the pieces of acquired temperature information are the same, a channel having a smaller channel number is allocated.

On the other hand, if the image processor of the executable job is not a module having the second largest memory access amount in step S809, the process advances to step S811. In step S811, the CPU 101 allocates a channel at the highest temperature as a memory to be used by the image processor of the executable job, based on the temperature information acquired in step S804, and the process advances to step S812.

Note that the first embodiment includes the four image processors and four memory channels, so a memory channel to be allocated to the image processor of the executable job is determined in one of steps S808, S810, S811, and S803.

In step S812, the CPU 101 secures a necessary memory area in accordance with the memory channel determined in one of steps S803, S808, S810, and S811. Then, the process advances to step S813, and the CPU 101 sets the top address of the memory area secured in step S812 in the register of the image processor to be used in the executable job.

A process by which the image processor uses a memory area will briefly be explained below.

The image processor includes various filtering processes to be performed in, for example, a smoothing process and image region determination process. In this filtering process, it is normally necessary to store image data input in a raster format by the same number as that of lines corresponding to the window width of the filter. In the first embodiment, a buffer for storing this image data corresponding to the number of lines is implemented by using the WideIO-SDRAM.

Then, in step S814, the CPU 101 activates the image processor to be used by the executable job, and performs, for example, image processing necessary for the job designated by the console unit 102 or the like. The activation of the image processor herein mentioned is to, for example, set the setting value of an enable register of the image processor in an enable state.

Thus, processing is executed by the image processor to be used by the job and the memory allocated to the image processor. When the job is complete, the CPU 101 releases the area of the memory channel secured for the job.

In the first embodiment as explained above, a memory channel to be used in an executable job can be determined based on the ordinal number of the memory access amount of each image processor, and the temperature information of each temperature sensor. Consequently, a memory channel at the lowest temperature can be allocated to a bottleneck function module (image processor) having a large access amount. This makes it possible to prevent a decrease in performance caused by heat generation by memory access.

Second Embodiment

In the above-described first embodiment, the method of allocating a memory channel to an image processor to be used in a job, when the job is executed, by using the temperature information of each memory channel and the ordinal number of the memory access amount of the image processor corresponding to the job is explained. By contrast, in the second embodiment, a method of determining the allocation of a memory channel by using processability information of an image processor in addition to the abovementioned information will be explained. Note that the hardware configuration of an MFP 100 and the arrangement of a SOC package 207 according to the second embodiment are the same as those of the first embodiment, so an explanation thereof will be omitted.

FIG. 10 depicts a view showing an example of a table setting the order of memory allocation by adding the processability of each image processor to the memory access amount order according to the second embodiment.

The performance of an image processor is determined by the access amount to a memory and the processability of the image processor. The processability is equivalent to a data amount processable per unit time. The memory allocation order is determined from the memory access amount ratio and processability ratio. The memory access amount ratio is a relative ratio of the memory access amount of each of image processors 108 to 110 when the memory access amount of a RIP 111 is "1". The processability ratio is a relative ratio indicating the processability of each of the image processors 108 to 110 when the processability of the RIP 111 is "1". The memory allocation order is determined by the order of values calculated by (memory access amount ratio)/(processability ratio). Note that the operation of allocating memories in order is the same as that of the above-described first embodiment.

In the example shown in FIG. 10, the processability of the scan image processor 110 is only "0.8" of the processability of other image processors. In this case, the memory access amount of the print image processor 109 is larger than that of the scan image processor 110, but the processability of the print image processor 109 is higher than that of the scan image processor 110. Accordingly, the ordinal number of memory allocation of the print image processor 109 is 0.7/1=0.7, and that of the scan image processor 110 is 0.6/0.8=0.75. That is, a memory is allocated to the scan image processor 110 before the print image processor 109. These values are precalculated when the MFP 100 is designed, and prestored in a register 314 (FIG. 3) as in the first embodiment.

In the second embodiment as explained above, a function module as a bottleneck can be specified more accurately by taking account of the memory access amount order and the processability of each function module, instead of the memory access amount order in the above-described first embodiment. Consequently, a decrease in performance caused by heat generation by a memory can be prevented by allocating a memory channel at a lower temperature to the bottleneck function module (image processor).

Third Embodiment

In the above-described first embodiment, the method of determining the allocation of a memory channel, when a job is executed, by using the temperature information of each memory channel and the memory access amount order of the image processors has been explained. By contrast, in the third embodiment, a method of determining the allocation of a memory channel by using access amount information that changes in accordance with the setting of an image processor in addition to the abovementioned information will be explained. Note that the hardware configuration of an MFP 100 and the arrangement of a SOC package 207 according to the third embodiment are the same as those of the first embodiment, so an explanation thereof will be omitted.

The memory access amount of an image processor changes in accordance with the setting of image processing. For example, in a function module for enlarging or reducing an image, an input data size to be read out from a memory remains unchanged, but a data size to be written in a memory increases, when the processing is enlargement, in accordance with the enlargement ratio. A method of controlling the change in access amount caused by the setting of image processing as described above will be explained below.

Figure 11A:
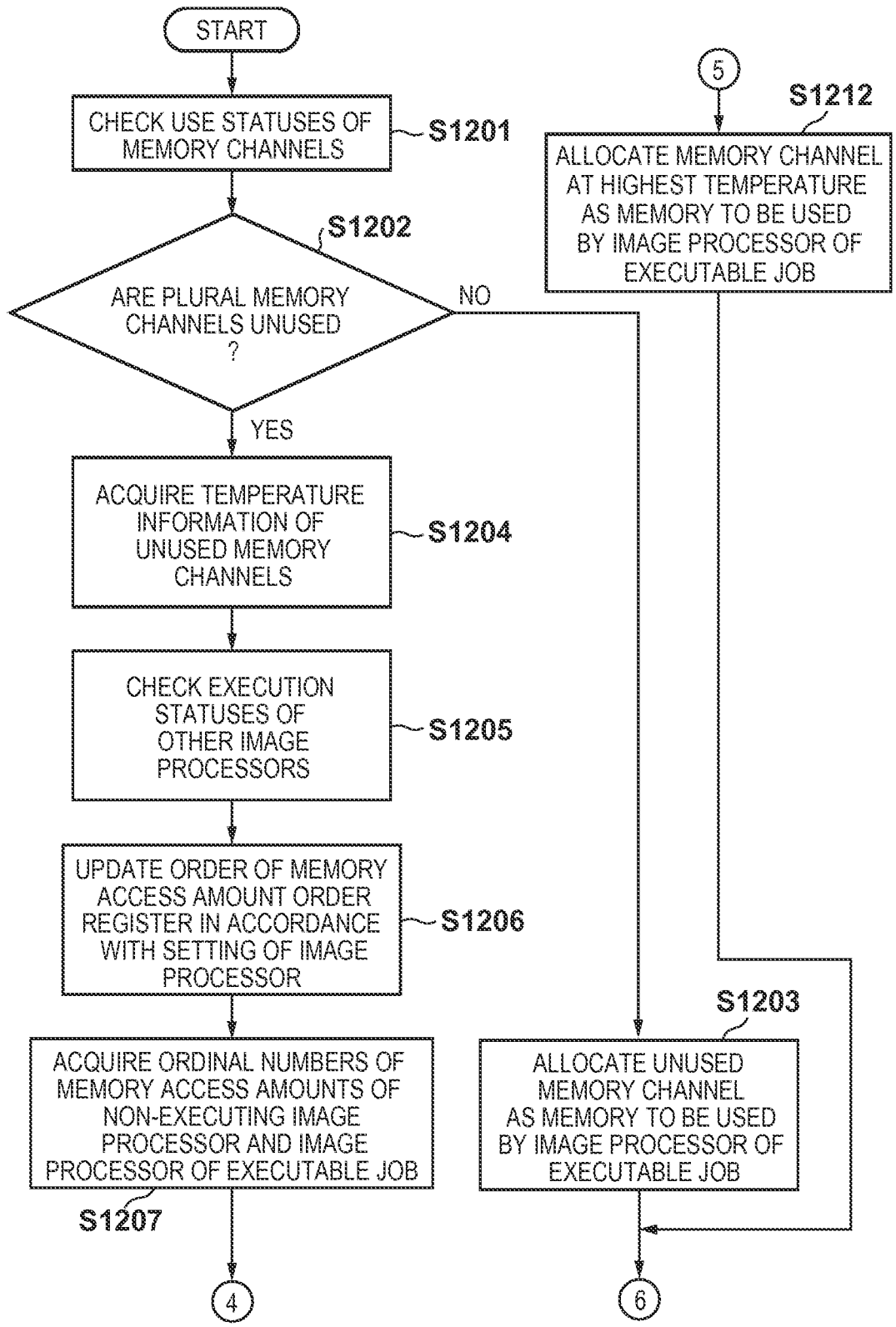
FIGS. 11A and 11B are flowcharts for describing a process of determining the allocation of memory channels when executing a job in an MFP according to the third embodiment.
Figure 11B:
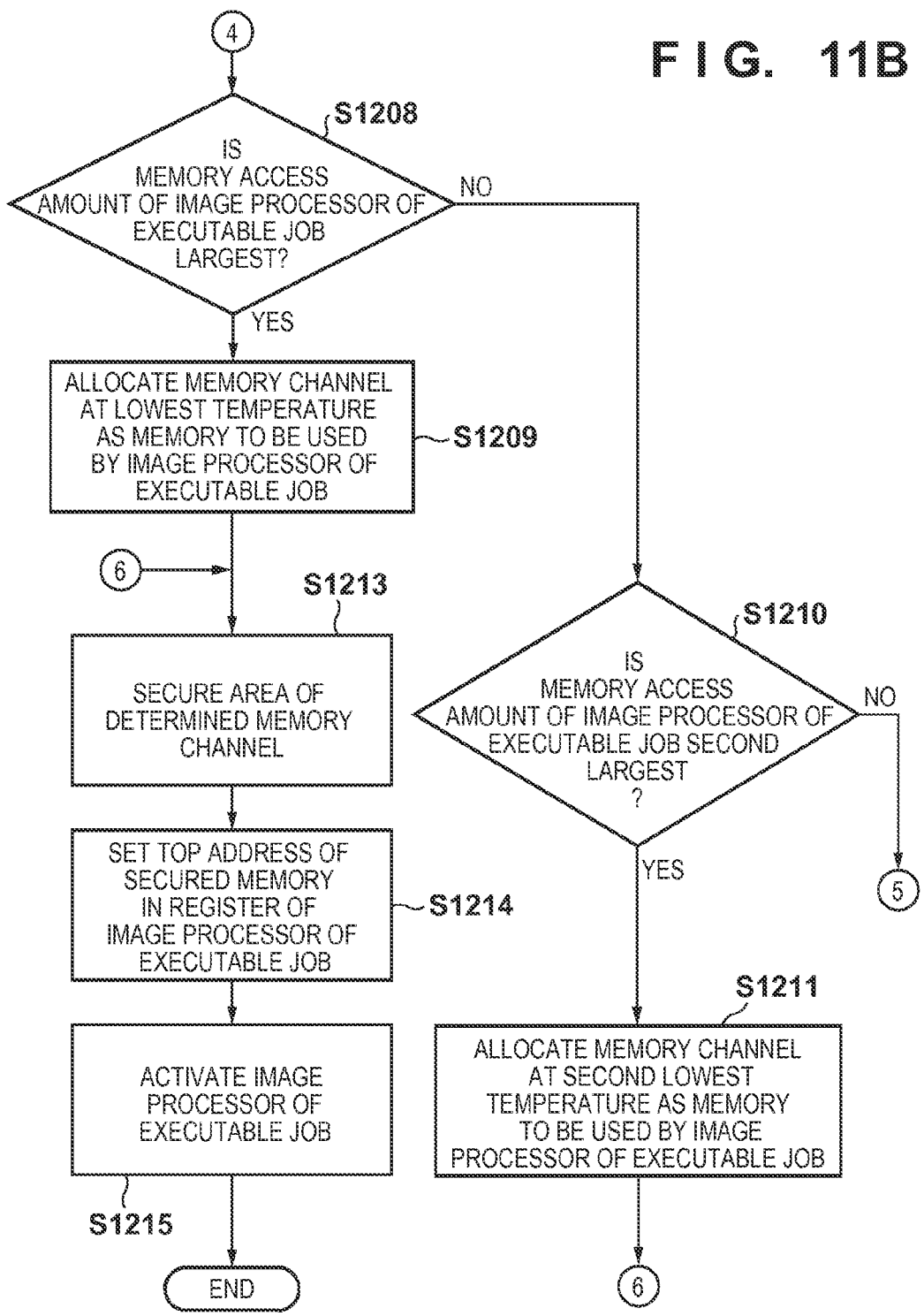

FIGS. 11A and 11B are flowcharts for explaining a process of determining the allocation of memory channels when executing a job in the MFP according to the third embodiment. Note that a program for executing this process is installed in an HDD 105. The process is implemented by deploying the program on an SDRAM, and executing the program on the SDRAM by a CPU 101. Note that processes in steps S1201 to S1205 and steps S1207 to S1215 in FIG. 11 are the same as the processes in steps S801 to S805 and steps S806 to S814 in FIG. 8, so an explanation thereof will be omitted.

In step S1205, the CPU 101 determines which image processor is not executing any processing based on the use statuses of memory channels acquired in step S1201, and the process advances to step S1206. In step S1206, the CPU 101 rewrites the value of a memory access amount order register 407 based on information set in each image processor.

FIG. 12 depicts a view showing an example of data of the memory access amount order register 407 according to the third embodiment.

Referring to FIG. 12, information indicating the memory access amount is added to the memory access amount order in FIG. 9B. FIG. 12 shows an example in which the memory access amount (120 MB) of an editing image processor 108 is updated by the setting for executing a job, and the ordinal number of the memory access amount is changed from "4" in FIG. 9B to "3". Note that the updated memory access amount information is restored to the default value when the execution of this job is complete.

In the third embodiment as explained above, the memory access amount is updated in accordance with the setting of image processing in an executable job, and the ordinal number of the memory access amount is changed accordingly. This makes it possible to more accurately calculate the memory access amount of each image processor. In addition, when allocating memory channels by referring to the temperature information of each channel, it is possible to more accurately allocate the memory channels in accordance with the setting of image processing. Consequently, it is possible to prevent a decrease in performance caused by heat generation due to memory access in a function module to be executed in the job.

In the embodiments as explained above, the temperature of each DRAM of the WideIO memory device is acquired, and a DRAM at the lowest temperature is allocated to a function module having the largest memory access amount to the DRAM. Consequently, when the function module accesses the memory, it is possible to prevent a decrease in performance by preventing the temperature rise of the DRAM.

Also, it is possible to more accurately specify a bottleneck function module and allocate a memory channel to the function module by determining the ordinal number of the memory access amount of each function module by taking account of the processability of each function module. This makes it possible to prevent a decrease in performance caused by the temperature rise of a DRAM resulting from memory access from a function module to be used in a job.

Furthermore, the memory access amount of an image processor of an executable job can be calculated more accurately by updating a necessary memory access amount in accordance with image processing set by the executable job, thereby changing the memory access amount order. This makes it possible to more accurately allocate a memory channel to the function module of the executable job. Consequently, it is possible to prevent a decrease in performance caused by the temperature rise of a DRAM resulting from memory access from the function module to be used in the executable job.

Note that the ordinal number of a memory access amount necessary for a function module is referred to in the above embodiments, but the ordinal number of a memory bandwidth necessary for the function module may also be referred to.

Other Embodiment

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium.

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

This application claims the benefit of Japanese Patent Application No. 2012-185765, filed Aug. 24, 2012, which is hereby incorporated by reference herein in its entirety.

What is claimed is:

1. An information processing apparatus having a WideIO memory device stacked on a System On a Chip (SOC) die including a CPU, the apparatus comprising:
   a plurality of memories of the WideIO memory device;
   a temperature acquisition unit configured to acquire temperature information of each of the plurality of memories of the WideIO memory device;
   a plurality of function modules configured to execute functions, wherein each function module executes a function by using each of the plurality of memories;
   a determination unit configured to determine, in a case that execution of a function is designated, a memory to be used by a function module corresponding to the function, based on a memory access amount of the function module corresponding to the function and the temperature information of the plurality of memories acquired by the temperature acquisition unit; and
   a storage unit configured to store memory access amounts of the plurality of function modules, a memory access amount relative ratio of the plurality of function modules, and a processability relative ratio of the plurality of function modules, and
      wherein the determination unit further determines a memory at a lowest temperature among unused memories, in descending orders of memory access amount relative ratio and processability relative ratio stored in the storage unit, as the memory to be used by the function module corresponding to the function.

2. The apparatus according to claim 1, further comprising:
   wherein in a case that the memory access amount of the function module corresponding to the function is largest, the determination unit further determines a memory at a lowest temperature among unused memories of the plurality of memories, as the memory to be used by the function module corresponding to the function.

3. The apparatus according to claim 1, wherein the execution of the function is designated by an input job.

4. The apparatus according to claim 1, further comprising a memory control unit configured to secure the memory to be used by the function module from memories determined by the determination unit, and releases the secured memory after processing by the function module is complete.

5. The apparatus according to claim 2, wherein the determination unit determines the memory to be used by the function module corresponding to the function, based on the memory access amount of a function module designated by the job, and the temperature information of the plurality of memories acquired by the temperature acquisition unit.

6. A method of controlling an information processing apparatus including a WideIO memory device stacked on a System On a Chip (SOC) die including a CPU, the method comprising:
 acquiring temperature information of each of a plurality of memories of the WideIO memory device;
 executing functions of a plurality of function modules, wherein each function module executes a function by using each of the plurality of memories;
 determining, in a case that execution of a function is designated, a memory to be used by a function module corresponding to the function, based on a memory access amount of the function module corresponding to the function and the temperature information of the plurality of memories acquired in the acquiring step; and
 storing memory access amounts of the plurality of function modules, a memory access amount relative ratio of the plurality of function modules, and a processability relative ratio of the plurality of function modules in a storage device, and
 wherein the determining step further determines a memory at a lowest temperature among unused memories, in descending orders of the memory access amount relative ratio and the processability relative ratio stored in the storage device, as the memory to be used by the function module corresponding to the function.

7. The method according to claim 6, further comprising:
 wherein in a case that the memory access amount of the function module corresponding to the function is largest, the determining step further determines a memory at a lowest temperature among unused memories of the plurality of memories, as the memory to be used by the function module corresponding to the function.

8. The method according to claim 6, wherein the execution of the function is designated by an input job.

9. The method according to claim 6, further comprising securing the memory to be used by the function module from memories determined in the determining step, and releases the secured memory after processing by the function module is complete.

10. The method according to claim 7, wherein the determining step determines the memory to be used by the function module corresponding to the function, based on the memory access amount of a function module designated by the job, and the temperature information of the plurality of memories acquired by the acquiring step.

11. A non-transitory computer-readable storage medium storing a program for causing a computer to execute the method according to claim 6.

* * * * *